United States Patent [19]

Ouchi et al.

[11] 4,442,220
[45] * Apr. 10, 1984

[54] DIELECTRIC CERAMICS

[75] Inventors: Hiromu Ouchi, Toyonaka; Syunichiro Kawashima, Nishinomiya; Masamitsu Nishida, Osaka; Ichiro Ueda, Nishinomiya, all of Japan

[73] Assignee: Matsushita Electric Industrial Co., Ltd., Osaka, Japan

[*] Notice: The portion of the term of this patent subsequent to May 18, 1999 has been disclaimed.

[21] Appl. No.: 367,977

[22] Filed: Apr. 13, 1982

[30] Foreign Application Priority Data

Apr. 15, 1981 [JP]   Japan .................................. 56-57375
Apr. 20, 1981 [JP]   Japan .................................. 56-60182

[51] Int. Cl.$^3$ ........................ C04B 35/46; C04B 35/50
[52] U.S. Cl. ............................... 501/139; 501/152
[58] Field of Search ............... 501/139, 138, 137, 136, 501/135, 134, 152; 423/263

[56] References Cited

U.S. PATENT DOCUMENTS

| | | | |
|---|---|---|---|
| 3,103,442 | 9/1963 | Zlotnick | 501/139 |
| 3,938,064 | 2/1976 | O'Bryan et al. | 501/137 X |
| 3,988,498 | 10/1976 | Maher | 428/433 X |
| 4,330,631 | 5/1982 | Kawashima et al. | 501/139 |
| 4,338,403 | 7/1982 | Kawashima et al. | 501/136 |
| 4,353,047 | 10/1982 | Noguchi et al. | 501/137 |

FOREIGN PATENT DOCUMENTS

| | | | |
|---|---|---|---|
| 50-20280 | 7/1975 | Japan | 501/152 |
| 51-44110 | 4/1976 | Japan | 501/139 |
| 53-74298 | 7/1978 | Japan | 501/139 |
| 56-143603 | 11/1981 | Japan | 501/137 |
| 56-165204 | 12/1981 | Japan | 501/137 |
| 1442285 | 7/1976 | United Kingdom | 501/139 |

*Primary Examiner*—Helen M. McCarthy
*Attorney, Agent, or Firm*—Wenderoth, Lind & Ponack

[57] ABSTRACT

A dielectric ceramic composition consisting essentially of a solid solution represented by the formula:

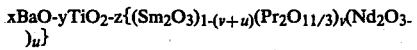

$$xBaO\text{-}yTiO_2\text{-}z\{(Sm_2O_3)_{1-(v+u)}(Pr_2O_{11/3})_v(Nd_2O_3)_u\}$$

wherein $0.05 \leq x \leq 0.23$, $0.57 \leq y \leq 0.825$, $0.025 \leq Z \leq 0.375$, $x+y+z=1$, $0 < v \leq 0.95$, $0 \leq u < 0.95$ and $0 < (v+u) \leq 0.95$.

The dielectric ceramics exhibits high dielectric constant and low microwave loss with high temperature stability in resonant frequency and is suitable for use as dielectric resonators, electrical filters and substrate.

3 Claims, No Drawings

DIELECTRIC CERAMICS

BACKGROUND OF THE INVENTION

This invention relates to dielectric ceramics. More particularly, this invention relates to dielectric ceramics having the composition of BaO-TiO$_2$-Sm$_2$O$_3$ type.

In the region of microwave frequencies, dielectrics have conventionally been utilized in impedance matching and dielectric resonators. With the recent progress in the microwave field, particularly in the technology of integrated microwave circuit, efforts have been made actively in the interested circle to promote miniaturization by utilizing a dielectric resonator, in which dielectric ceramics with a high dielectric constant and low loss are used for stabilizing the frequency of an oscillator.

As a dielectric material suitable for these uses, a BaO-TiO$_2$ type ceramic, a ceramic obtainable by partially replacing it with another element or a dielectric material obtainable by combining TiO$_2$ having a negative temperature coefficient of dielectric constant with dielectric ceramics or glass having a positive temperature coefficient of dielectric constant in order to control said temperature coefficient has hitherto been used in many cases. However, these materials have many practical problems such as low dielectric constant, high dielectric loss, difficulty of obtaining a product having the desired temperature coefficient when used as a dielectric resonator, and so on.

SUMMARY OF THE INVENTION

An object of this invention is to provide an improved ceramic material for a dielectric resonator with a high dielectric constant ($\epsilon_r$), a high unloaded Q (Q$_u$) and a small temperature coefficient of resonant frequency ($\tau_f$) which can be varied in a broad range by varying the chemical composition.

According to this invention, dielectric ceramics consist of BaO, TiO$_2$, Sm$_2$O$_3$ and an additive element consisting of at least Pr$_2$O$_{11/3}$ and optionally Nd$_2$O$_3$, the additive element being present as a substituent for up to 0.95 mole fraction of the Sm$_2$O$_3$ in said ceramics. And a composition thereof is represented by the following formula:

$$x\text{BaO-}y\text{TiO}_2\text{-}z\{(\text{Sm}_2\text{O}_3)_{1-(v+u)}(\text{Pr}_2\text{O}_{11/3})_v(\text{Nd}_2\text{O}_3)_u\}$$

wherein $0.05 \leq x \leq 0.23$, $0.57 \leq y \leq 0.825$, $0.025 \leq z \leq 0.375$, $x+y+z=1$, $0 < v \leq 0.95$, $0 \leq u < 0.95$ and $0 < (v+u) \leq 0.95$.

DETAILED DESCRIPTION OF THE INVENTION

Hereunder, this invention is illustrated with reference to examples.

EXAMPLE 1

As starting materials, powdered BaCo$_3$, TiO$_2$, Sm$_2$O$_3$ and Pr$_6$O$_{11}$ all having a chemically high purity were weighed according to the predetermined composition ratio shown in the following Table 1 and mixed in wet together with pure water in a rubber-lined ball mill with agate balls. The mixture was taken out of the ball mill, dried and molded into a disk under a pressure of 400 kg/cm$^2$, and calcined in the air at 900° C. for 2 hours. The calcined powders were again charged together with pure water in the same ball mill as used above and wet-ground. The pulverized slurry was dehydrated and dried to give a powder.

The powder was uniformly mixed with 8% by weight of a solution of polyvinyl alcohol having a concentration of 3% as a binder and then passed through a 32 mesh sieve for granulation. The granules were molded under a pressure of 800 kg/cm$^2$ into a disk of 20 mm in diameter and about 8 to 10 mm in thickness. The molded product was placed in an alumina crucible made of high purity alumina, and fired in air at a temperature of 1200° to 1550° C. for 1 to 2 hours, provided that the conditions of firing were varied in accordance with the composition.

In the same manner as described above, there were obtained specimens of various composition as shown in Table 1.

Using the ceramic elements thus obtained, the resonant frequency and unloaded Q of each specimen were measured by using the specimen as a microwave dielectric resonator. The dielectric constant was determined by calculation from the resonant frequency and dimensions of the specimen. The temperature coefficient of resonant frequency ($\tau_f$) was determined from the measurements of temperature dependence of the resonant frequency in the range of from −30° to 70° C. The resonant frequency was 2 to 4 GHz. The results of the experiments are summarized in the following table 1.

TABLE 1

| Sample No. | Composition (mole fraction) | | | | $\epsilon_r$ | $Q_u$ | $\tau_f$ (ppm/°C.) |
| | x | y | z | v | | | |
|---|---|---|---|---|---|---|---|
| *1 | 0.157 | 0.684 | 0.159 | 0 | 83 | 1720 | −4 |
| 2 | 0.157 | 0.684 | 0.159 | 0.01 | 84 | 1850 | −3 |
| 3 | 0.157 | 0.684 | 0.159 | 0.35 | 87 | 2390 | 2 |
| 4 | 0.157 | 0.684 | 0.159 | 0.6 | 89 | 2560 | 10 |
| 5 | 0.157 | 0.684 | 0.159 | 0.75 | 91 | 2510 | 32 |
| 6 | 0.157 | 0.684 | 0.159 | 0.9 | 92 | 2420 | 85 |
| 7 | 0.157 | 0.684 | 0.159 | 0.95 | 89 | 2230 | 120 |
| *8 | 0.157 | 0.684 | 0.159 | 1 | 82 | 1650 | 183 |
| 9 | 0.174 | 0.667 | 0.159 | 0.5 | 85 | 2340 | 35 |
| *10 | 0.23 | 0.57 | 0.2 | 0 | 51 | 520 | −253 |
| 11 | 0.23 | 0.57 | 0.2 | 0.2 | 52 | 790 | −194 |
| *12 | 0.15 | 0.825 | 0.025 | 0 | 50 | 610 | −80 |
| 13 | 0.15 | 0.825 | 0.025 | 0.2 | 54 | 860 | −49 |
| 14 | 0.147 | 0.677 | 0.176 | 0.6 | 82 | 2520 | 35 |
| 15 | 0.147 | 0.677 | 0.176 | 0.8 | 84 | 2710 | 62 |
| 16 | 0.1 | 0.62 | 0.28 | 0.7 | 59 | 820 | 81 |
| *17 | 0.05 | 0.575 | 0.375 | 0 | 32 | 330 | 170 |
| 18 | 0.05 | 0.575 | 0.375 | 0.5 | 35 | 540 | 240 |

Notes
(1) *: Comparative examples out of the scope of this invention
(2) $\epsilon_r$: Dielectric Constant
(3) $Q_u$: Unloaded Q
(4) $\tau_f$: Temperature Coefficient In the Table 1, the samples marked with * are comparative examples out of the scope of this invention, and the other samples are examples which are in the scope of this invention. That is, if the amount of BaO(x) is larger than 0.23 mole fraction or the amount of TiO$_2$(y) is smaller than 0.57 mole fraction or the amount of Sm$_2$O$_3$(z) is smaller than 0.025 mole fraction, unloaded Q is so low as to be unmeasurable and, in addition, the temperature coefficient of resonant frequency is so large as to make the ceramics useless.

If the amount of BaO(x) is smaller than 0.05 mole fraction or the amount of TiO$_2$(y) is larger than 0.825 mole fraction or the amount of Sm$_2$O$_3$(z) is larger than 0.375 mole fraction, unloaded Q similarly drops to become unmeasurable. If the amount of Pr$_2$O$_{11/3}$(V) is larger than 0.95 mole fraction, the temperature coefficient of resonant frequency becomes large and useless for dielectric resonator in the microwave region. Accordingly, the above-mentioned ranges are excepted from the scope of this invention.

EXAMPLE 2

As starting materials, powdered $BaCO_3$, $TiO_2$, $Sm_2O_3$, $Pr_6O_{11}$ and $Nd_2O_3$ all having a chemically high purity were weighed according to the predetermined composition ratio shown in the following Table 2. The preparation and measurements of dielectric ceramic specimens were carried out in the same manner as in Example 1. The experimental compositions and characteristics of the ceramic speciments were as shown in Table 2.

TABLE 2

| Sample No. | x (mole fraction) | y | z | v | u | $\epsilon_r$ | $Q_u$ | $\tau_f$ (ppm °C.) |
|---|---|---|---|---|---|---|---|---|
| *1  | 0.147 | 0.677 | 0.176 | 0     | 0     | 81 | 2070 | −25  |
| 2   | 0.147 | 0.677 | 0.176 | 0.058 | 0.141 | 82 | 2100 | −71  |
| 3   | 0.147 | 0.677 | 0.176 | 0.115 | 0.283 | 83 | 2530 | 3    |
| 4   | 0.147 | 0.677 | 0.176 | 0.175 | 0.427 | 84 | 2770 | 23   |
| 5   | 0.147 | 0.677 | 0.176 | 0.232 | 0.569 | 85 | 2770 | 49   |
| 6   | 0.147 | 0.677 | 0.176 | 0.275 | 0.675 | 86 | 2560 | 62   |
| *7  | 0.147 | 0.677 | 0.176 | 0.29  | 0.71  | 87 | 2320 | 79   |
| *8  | 0.171 | 0.686 | 0.143 | 0     | 0     | 75 | 2350 | −12  |
| 9   | 0.171 | 0.686 | 0.143 | 0.061 | 0.142 | 77 | 2560 | 8    |
| 10  | 0.171 | 0.686 | 0.143 | 0.12  | 0.297 | 79 | 2670 | 29   |
| 11  | 0.171 | 0.686 | 0.143 | 0.18  | 0.421 | 79 | 2670 | 52   |
| 12  | 0.171 | 0.686 | 0.143 | 0.239 | 0.558 | 81 | 2520 | 77   |
| 13  | 0.171 | 0.686 | 0.143 | 0.285 | 0.665 | 82 | 2430 | 96   |
| *14 | 0.171 | 0.686 | 0.143 | 0.3   | 0.7   | 83 | 2160 | 109  |
| *15 | 0.23  | 0.57  | 0.2   | 0     | 0     | 51 | 520  | −253 |
| 16  | 0.23  | 0.57  | 0.2   | 0.01  | 0.01  | 52 | 630  | −198 |
| 17  | 0.23  | 0.57  | 0.2   | 0.25  | 0.25  | 54 | 810  | 35   |
| 18  | 0.23  | 0.57  | 0.2   | 0.47  | 0.48  | 56 | 760  | 82   |
| *19 | 0.15  | 0.825 | 0.025 | 0     | 0     | 50 | 610  | −80  |
| 20  | 0.15  | 0.825 | 0.025 | 0.4   | 0.1   | 54 | 790  | −36  |
| 21  | 0.15  | 0.825 | 0.025 | 0.4   | 0.2   | 56 | 850  | 24   |
| 22  | 0.15  | 0.825 | 0.025 | 0.65  | 0.3   | 57 | 730  | 58   |
| *23 | 0.05  | 0.575 | 0.375 | 0     | 0     | 32 | 330  | 170  |
| 24  | 0.05  | 0.575 | 0.375 | 0.1   | 0.3   | 34 | 520  | 215  |
| 25  | 0.05  | 0.575 | 0.375 | 0.65  | 0.3   | 37 | 480  | 267  |

Notes
(1) *: Comparative examples out of the scope of this invention
(2) $\epsilon_r$: Dielectric Constant
(3) $Q_u$: Unloaded Q
(4) $\tau_f$: Temperature Coefficient In the Table 2, the samples marked with * are comparative examples out of the scope of this invention, and the other samples are examples which are in the scope of this invention. That is, if the amount of BaO is larger than 0.23 mole fraction or the amount of $TiO_2(y)$ is smaller than 0.57 mole fraction or the amount of $Sm_2O_3(z)$ is smaller than 0.025 mole fraction, unloaded Q is so low as to be unmeasurable and, in addition, the temperature coefficient of resonant frequency becomes so large as to be useless for dielectric resonator in the microwave region. If the amount of BaO(x) is smaller than 0.05 mole fraction or the amount of $TiO_2(y)$ is larger than 0.825 mole fraction or the amount of $Sm_2O_3(z)$ is larger than 0.375 mole fraction, unloaded Q drops to become unmeasurable. The total amount of $Pr_2O_{11/3}(v)$ and $Nd_2O_3(u)$ is larger than 0.95 mole fraction (but excluding v=0, and excluding u=0), the temperature coefficient of resonant frequency becomes large and useless. Accordingly, the above-mentioned ranges are excepted from the scope of this invention.

As is apparent from the description given above, the dielectric ceramic composition according to this invention exhibits a high dielectric constant and low microwave loss. Further, since the temperature coefficient of resonant frequency can be selected from a wide range by changing its composition, it has great merit as a circuit element for temperature compensation. Thus, it has notably advantageous characteristics for the industrial uses.

What is claimed is:

1. A dielectric ceramic composition consisting of barium oxide, titanium oxide, samarium oxide and praseodymium oxide in which the composition formula is represented by $$xBaO\text{-}yTiO_2\text{-}z\{(Sm_2O_3)_{1-v}(Pr_2O_{11/3})_v\}$$

wherein x, y, z and v in terms of mole fraction fall in the range that $0.05 \leq x \leq 0.23$, $0.57 \leq y \leq 0.825$, $0.025 \leq z \leq 0.375$, $x+y+z=1$, and $0.01 \leq v \leq 0.95$.

2. A dielectric ceramic composition consisting of barium oxide, titanium oxide, samarium oxide, praseodymium oxide and neodymium oxide in which the composition formula is represented by $$xBaO\text{-}yTiO_2\text{-}z\{(Sm_2O_3)_{1-(v+u)}(Pr_2O_{11/3})_v(Nd_2O_3)_u\}$$

wherein x, y, z, v and u in terms of mole fraction fall in the range that $0.05 \leq x \leq 0.23$, $0.57 \leq y \leq 0.825$, $0.025 \leq z \leq 0.375$, $x+y+z=1$, $0.01 \leq v \leq 0.65$, $0.01 \leq u \leq 0.665$ and $0.02 \leq (v+u) \leq 0.95$.

3. A dielectric ceramics consisting of a solid solution having the composition as defined in claim 1 or 2.

* * * * *